(12) United States Patent
Taniguchi (10) Patent No.: US 6,737,835 B2
(45) Date of Patent: May 18, 2004

(54) VEHICLE AC GENERATOR HAVING ROTATION SPEED DETECTOR

(75) Inventor: Makoto Taniguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/379,001

(22) Filed: Mar. 5, 2003

(65) Prior Publication Data

US 2003/0178907 A1 Sep. 25, 2003

(30) Foreign Application Priority Data

Mar. 20, 2002 (JP) ........................ 2002-078274

(51) Int. Cl.[7] ............... H02H 7/06; H02P 11/00; H02P 9/00
(52) U.S. Cl. ................................ 322/29; 322/28
(58) Field of Search .................... 322/29, 28, 25, 322/86, 8

(56) References Cited

U.S. PATENT DOCUMENTS

| | | | | |
|---|---|---|---|---|
| 4,973,896 A | * | 11/1990 | Shiga et al. | 322/28 |
| 5,581,172 A | * | 12/1996 | Iwatani et al. | 322/28 |
| 6,058,057 A | | 5/2000 | Ochiai et al. | |
| 6,259,283 B1 | | 7/2001 | Nguyen | |
| 6,456,048 B2 | * | 9/2002 | Taniguchi et al. | 322/28 |
| 6,566,845 B2 | * | 5/2003 | Taniguchi et al. | 322/28 |
| 6,621,251 B2 | * | 9/2003 | Ogino et al. | 322/28 |
| 2002/0024314 A1 | | 2/2002 | Takahashi et al. | |

* cited by examiner

Primary Examiner—Thanh Lam
(74) Attorney, Agent, or Firm—Oliff & Berridge, PLC

(57) ABSTRACT

Two kinds of ac generators for vehicles that have different number of magnetic poles have a common controller for detecting rotation speed according to frequency of voltage induced in one of phase-windings. The controller includes a frequency-pulse conversion circuit for providing a pulse signal having a plurality of times as many frequencies as the voltage induced in the phase-winding. The frequency-pulse conversion circuit is formed on an IC chip so that the number of pulses of the pulse signal can be easily changed by modifying a portion of the IC chip to detect accurate rotation speed based on either one of the frequency of the voltage generated by the ac generators.

8 Claims, 6 Drawing Sheets

VEHICLE AC GENERATOR HAVING ROTATION SPEED DETECTOR

CROSS REFERENCE TO RELATED APPLICATION

The present application is based on and claims priority from Japanese Patent Application 2002-78274, filed Mar. 20, 2002, the contents of which are incorporated herein by reference.

BACKGROUND OF THE INVENTION

1. Field of the Invention

The present invention relates to an ac generator for a vehicle such as a truck, a passenger car or the like.

2. Description of the Related Art

Power of vehicle generators has been increased to operate various control devices, while the size of the vehicle generators has to be kept as small as possible in order to be disposed in an engine compartment that contains those of the various control devices.

In order to increase the output power of ac the generator, the number of magnetic poles of the vehicle ac generator has been increased from 12 to 14 or 16. This change does not increase production cost very much, because such ac generators having different number of magnetic poles can use many common parts and or components.

It is known that the output power of an ac generator is controlled according to rotation speed of the rotor. The rotation speed is detected by a rotation speed detector from voltage induced in a phase winding of the ac generator by residual magnetism. The phase voltage is converted into a pulse signal having a frequency, from which the rotation speed is counted.

If the number of magnetic poles changes, a ratio of the frequency to the rotation speed also changes. Therefore, it is impossible to use a conventional rotation detector to ac generators having different number of magnetic poles.

SUMMARY OF THE INVENTION

It is a main object of the invention to provide a vehicle ac generator that has an improved rotation speed detecting device that can be adjusted according to the number of magnetic poles when or after it is assembled.

According to a feature of the invention, an ac generator for a vehicle includes a controller having means for detecting rotation speed of a rotor according to frequency of voltage induced in a phase-winding. The controller includes a frequency-pulse conversion circuit for providing a pulse signal having a plurality of times as many frequencies as the voltage induced in the phase-winding. The detecting means detects the rotation speed based on the pulse signal. The frequency-pulse conversion circuit can be applied to at least two kinds of ac generator that has different number of magnetic poles to detect the rotation speed.

Preferably, the pulse signal has 7 times as many frequencies as the voltage induced in the phase-winding. The frequency-pulse conversion circuit of the ac generator is composed of a wave-shaping section and a pulse multiplying section. Therefore, the voltage is converted into a rectangular wave voltage signal having a basic frequency, which is converted into a pulse signal having a predetermined number of times as many pulses as the basic frequency. For that purpose, the pulse multiplying section is composed of 6 serial pulse increase stages each of which adds one pulse formed from a leading edge of a pulse of a pulse signal inputted thereto that delays by a predetermined time, which is an ordinal number of the stage×the delay time.

The pulse signal may have 4 times as many frequencies as the voltage induced in the phase-winding. In this case, the pulse multiplying section is composed of 3 serial pulse increase stages each of which increases one pulse formed from a leading edge of a pulse of a pulse signal inputted thereto that delays by a predetermined delay time, which is an ordinal number of the stage×the delay time. In this case, three pulse increase stages can be applied either to an ac generator having six pairs of magnetic poles or to another ac generator having eight pairs of magnetic poles if one pulse increase stage is invalidated. Thus, it is not necessary to change the rotation speed detecting means.

The frequency-pulse conversion circuit of the above controller is composed of a clock for generating a basic clock signal and a plurality of serially-connected frequency dividing circuits. The basic clock signal has such a frequency that the output signal of the final increase stage can have a shorter cycle than a half of a maximum cycle of the voltage induced in the phase winding. Therefore, the pulse multiplying section can operate accurately because the increased pulses do not overlap each other.

The frequency-pulse conversion circuit provides the pulse signal having a pulse cycle that is determined according to a multiplying command signal sent from the rotation speed detecting means. The rotation speed detecting means determines the pulse cycle according to the rotation speed of the rotor that is calculated from a frequency of the pulse signal inputted thereto so that the pulse cycle can become shorter as the rotation speed of the rotor is higher and longer as the rotation speed is lower. This improves noise proof characteristic of the circuit.

According to another feature of the invention, a method of manufacturing two kinds of ac generators each of which has a controller that is composed of a rotation speed detecting means and a frequency-pulse conversion circuit. The method includes a step of forming the frequency-pulse conversion circuit for a larger number P1 of pairs of magnetic poles on an IC chip, a step of changing the frequency-pulse conversion circuit to a modified frequency-pulse conversion circuit for a smaller number P2 of pairs of magnetic poles on an IC chip by invalidating connection of a portion of the frequency-pulse conversion circuit by changing a portion of the IC chip, thereby changing N1 to N2 that is P1×N1/P2. The rotation speed detecting means may be formed on an IC chip that is different from the frequency-pulse conversion circuit so that the IC chip on which the rotation speed detecting means is formed can be used for different kinds of ac generators without change. However, the rotation speed detecting means may be integrated into the IC chip together with said frequency-pulse conversion circuit. Preferably, P1×N1 or P2×P2 is the least common multiple of P1 and P2.

In the above method, the frequency-pulse conversion circuit preferably includes a wave-shaping section, a pulse multiplying section, and a pulse reducing section. The wave-shaping section forms the voltage induced in a phase-winding into a rectangular wave voltage signal having a frequency. The pulse multiplying section provides a pulse signal having a predetermined number of times as many pulses as the frequency of the rectangular wave voltage signal, and the pulse reducing section provides a pulse signal having a fraction of the pulses of the pulse signal provided by the pulse multiplying section.

The frequency-pulse conversion circuit is formed by the following steps:

a step of forming a first frequency-pulse conversion circuit for outputting the pulse signal provided by the pulse multiplying section and a second frequency-pulse conversion circuit for outputting the fraction of the pulses of the pulse signal or the rectangular wave signal to the rotation speed detecting means;

a step of mounting the first frequency-pulse conversion circuit into a first controller for one of ac generators; and a step of mounting the second frequency-pulse conversion circuit into a second controller for the other ac generator.

Therefore, the frequency provided by the multiplying section to be applied to one ac generator can be reduced by the pulse reducing section to be applied to the other ac generator easily.

In the above-described method, the pulse multiplying section preferably includes a plurality of serial pulse increase stages each of which adds one pulse formed from a leading edge of a pulse of a pulse signal inputted thereto that delays by a predetermined time, which is an ordinal number of the stage×the delay time. The method further includes a step of changing the serial pulse increase stages to form a first frequency-pulse conversion circuit and a second frequency-pulse conversion circuit, a step of mounting the first frequency-pulse conversion circuit into a first controller for one ac generator, and a step of mounting the second frequency-pulse conversion circuit into a second controller for the other ac generator.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
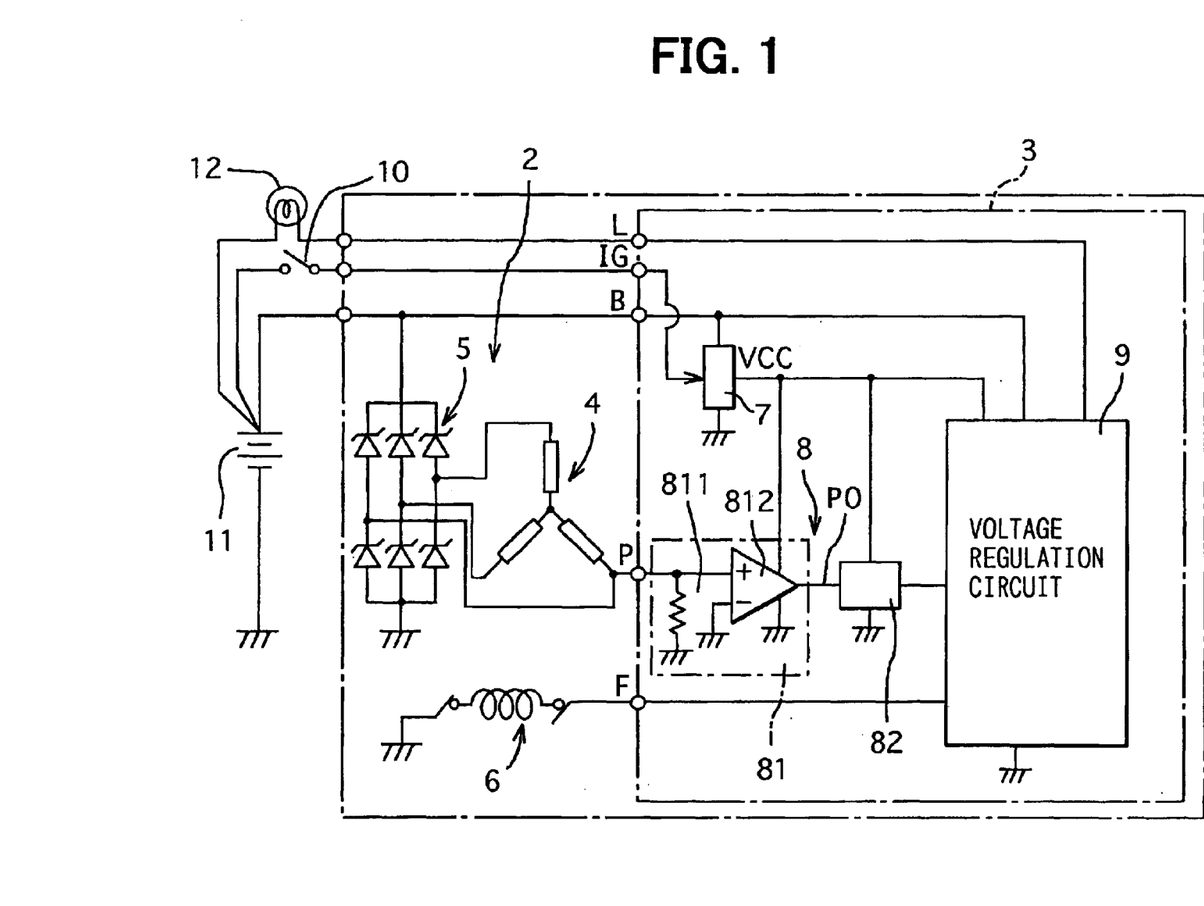
FIG. 1 is a schematic circuit diagram illustrating an ac generator for a vehicle according to the first embodiment of the invention.

As shown in FIG. 1, a vehicle ac generator apparatus 1, which is so called an alternator, includes a generator 2 and a controller 3 that controls the generator 2.

The generator 2 includes a three-phase stator winding 4, a rectifier unit 5 that is composed of a bridge circuit of diodes and a rotor having a plurality P of claw poles and a field coil 6 enclosed by the claw poles. The generator 2 is not limited to the above-described generator. The generator 2 may be a permanent magnet type three-phase synchronous generator or a reluctance type three-phase synchronous generator.

The controller 3 controls field current supplied to the field coil 6 to regulate the output voltage of the alternator within a predetermined voltage range. The controller 3 includes a constant voltage source circuit 7, a frequency-pulse conversion circuit 8 and a voltage regulation circuit 9. The controller 3 has an IG terminal connected to a positive terminal of a battery 11 through a key switch 10, an L-terminal connected to the positive terminal of the battery 11 through a lamp 12, a B-terminal connected to the positive terminal of the battery 11, a P-terminal connected to an output end of a phase-winding of the three-phase stator winding 4 and an F-terminal connected to an end of the field coil 6.

The constant voltage electric source circuit 7 outputs a constant voltage Vcc of the controller 3 when the key switch 10 is turned on. The constant voltage Vcc is formed from the voltage supplied from the B-terminal. The frequency-pulse conversion circuit 8 is composed of a wave-shaping circuit 81 and a pulse multiplying section 82. The wave-shaping circuit 81 includes a resistor 811 and a comparator 812 and converts the voltage (hereinafter referred to P-voltage) of the P-terminal into a pulse signal. The wave-shaping circuit 81 shapes the wave shape of the P-voltage into a rectangular wave signal or pulse signal PO whose duty ratio is about 50%.

The pulse multiplying section 82 increases the frequency of the rectangular wave voltage signal or pulse signal outputted from the frequency-pulse conversion section 81.

The voltage regulation circuit 9 supplies or cut the field current according to a rotation speed signal that is proportional to the number of pulses that is outputted from the pulse multiplying section 82. The voltage regulation circuit 9 also operates a warning lamp 12 when it detects a failure of the generator 2 and controls the field current to regulate the terminal voltage of the battery 11 within a target voltage range.

Figure 2:
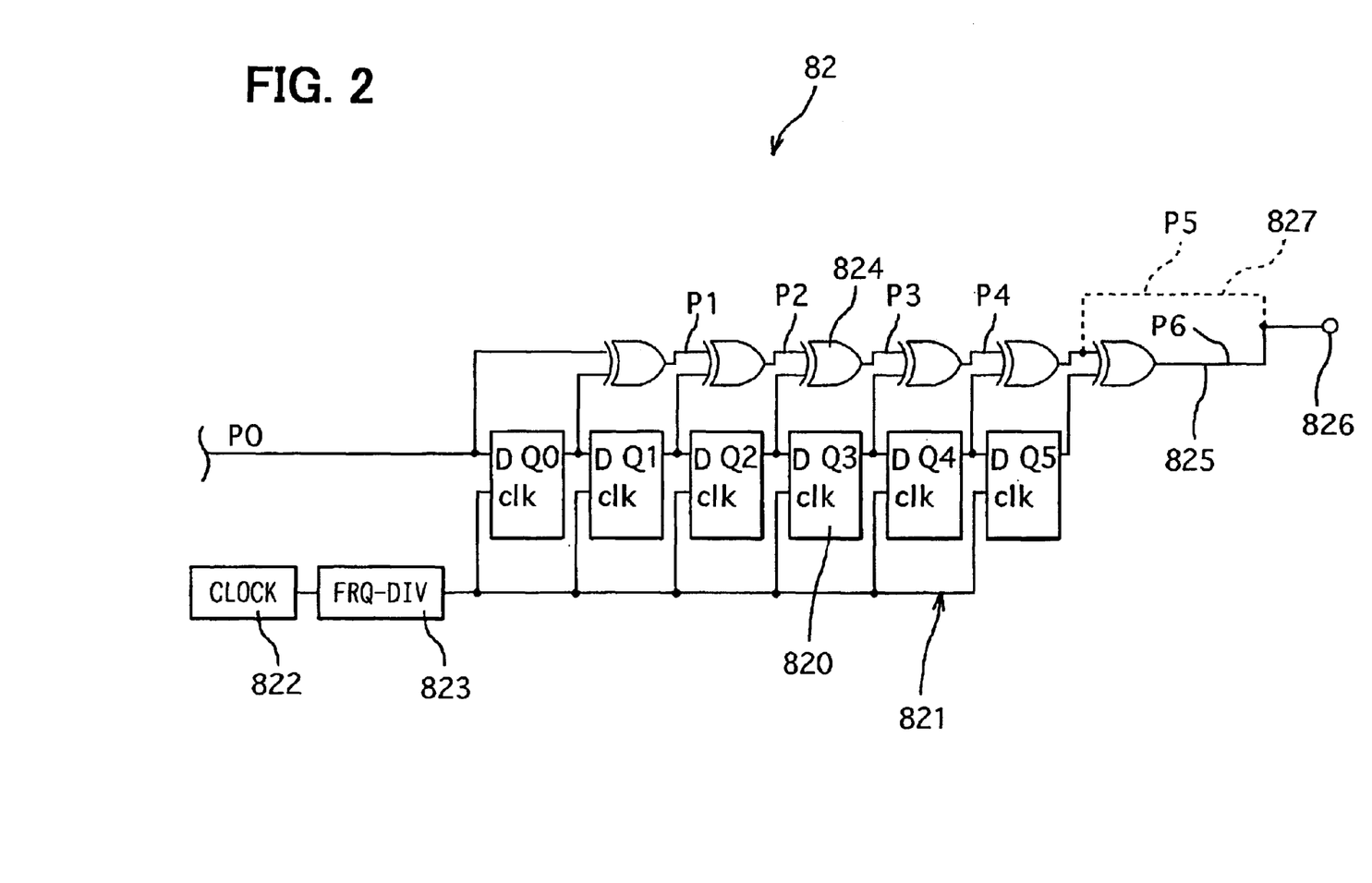
FIG. 2 is a circuit diagram of a frequency-pulse conversion circuit shown in FIG. 1.

As shown in FIG. 2, the pulse multiplying section 82 includes a delay-type shift register 821 that is composed of six serially connected D flip flop circuits, a clock circuit 822 that generates a clock pulse signal having a basic frequency, a frequency dividing circuit 823 that divides the basic frequency of the clock pulse signal and six serially connected exclusive OR (hereinafter referred to as EX-OR) circuits 824.

The EX-OR circuit 824 of the first stage outputs a signal P1 that is an exclusive OR signal of PO and the output signal of the D flip flop circuit 820 of the first stage. The EX-OR circuit 824 of the second stage outputs a signal P2 that is an exclusive OR signal of the signal P1 and the output signal of the D flip flop circuit 820 of the second stage. The EX-OR circuit 824 of the other stages respectively output signals P3, P4, P5 and P6 that are exclusive OR signals of the output signals P2, P3, P4 and P5 and the output signals of the D flip flop circuits 820 of the stages that correspond to the stages of the EX-OR circuits 820, in the same manner as described above.

Figure 3:
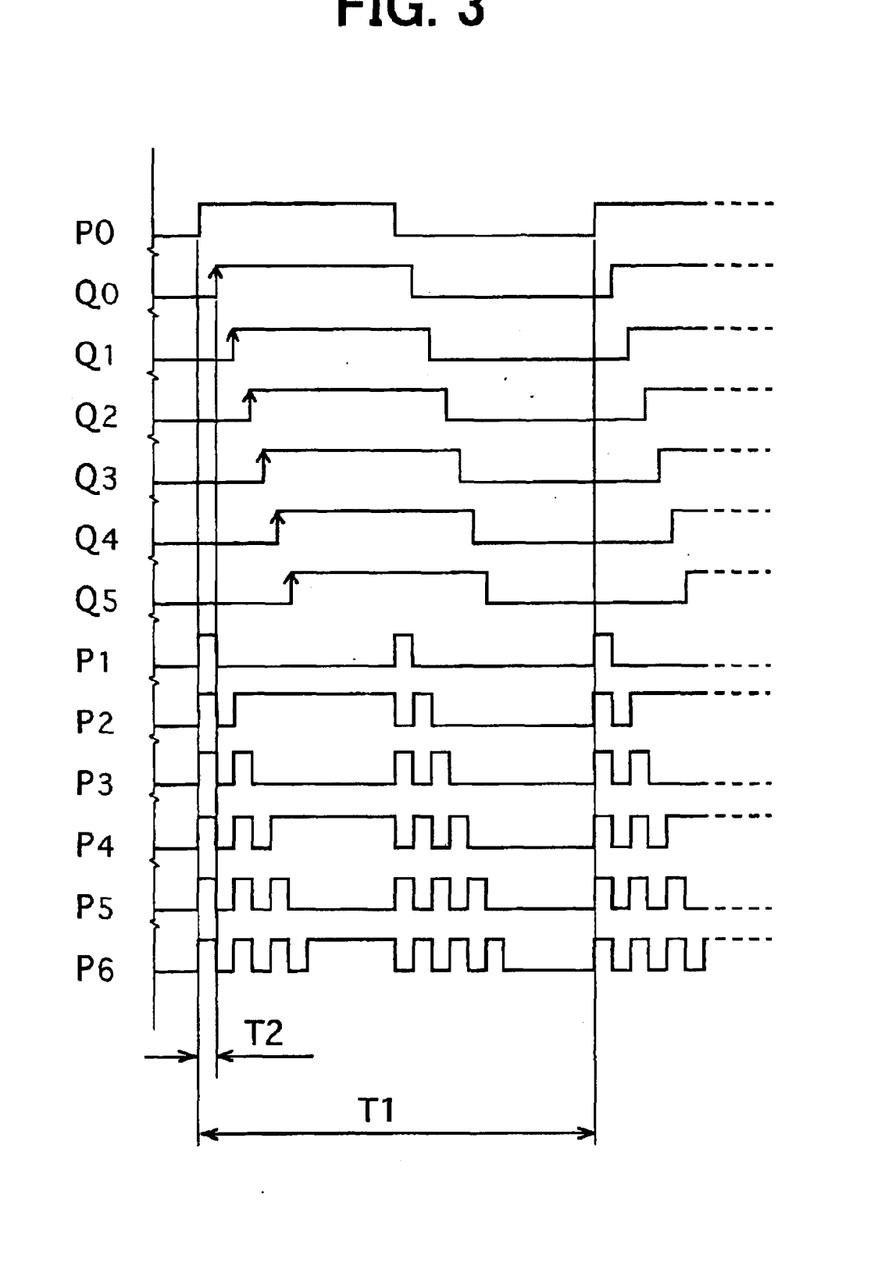
FIG. 3 is a timing diagram showing operation of the frequency-pulse conversion circuit.

Thus, as shown in FIG. 3, the frequency of the signal P6, which is outputted from the EX-OR circuit 820 of the final stage, becomes seven times as many as the frequency of the signal PO. The frequency of the signal P5, which is outputted from the EX-OR circuit 820 of the fifth stage, becomes six times as many as the frequency of the signal PO.

If this circuit is applied to an ac generator having a rotor with twelve magnetic poles or six pairs of the magnetic poles, the pulse signal P6 is used. On the other hand, the pulse P5 is used if this circuit is applied to an ac generator having a rotor with fourteen poles or seven pairs of poles.

The multiple number seven (7) or six (6) can be easily changed by changing a wiring mask in a process of manufacturing an IC chip of the pulse multiplying section 82. In FIG. 2, a solid line 825 indicates a lead wire in a wiring mask that connects the output terminal 826 of the frequency-pulse conversion circuit 8 and the output terminal of the EX-OR circuit 824 of the final stage in a process of manufacturing an IC chip that includes the frequency-pulse conversion circuit 8 for an ac generator having a rotor with six pairs of magnetic poles.

Thus, the output terminal of the frequency-pulse conversion circuit 8 can be connected by the wiring mask either to the output terminal of the EX-OR circuit 824 of the final stage, as indicated by the solid line 825 or to the output terminal of the EX-OR circuit 824 of the fifth stage (second from the final stage), as indicated by the dotted line 827, so that the multiple number seven or six can be selected easily. If the mask indicated by the dotted line 827 is to be used, power lines connected between a power source and the EX-OR circuit 824 of the final stage and the D flip flop circuit 820 of the final stage may be cut.

The multiple number of the frequency-pulse conversion circuit 8 can be also changed by changing a bonding pattern formed between the bonding area of the IC chip and lead terminals of an IC package in which the IC chip is mounted. If the lead terminals are formed from a lead frame, a short-circuiting metal area is also formed so that a bonding wire can be connected to the short-circuiting metal area if necessary.

The above connection can be also carried out by changing a wiring pattern of the lead frame on which the IC chip of the frequency-pulse conversion circuit 8 is mounted. The wiring pattern of the lead frame can be changed only by changing the shape of a punching die for punching a copper sheet.

Thus, the pulse signal P6 that has 7 pulses each cycle can be obtained from the output voltage in case of a generator that has 12 magnetic poles, and the pulse signal P5 that has 6 pulses each cycle can be obtained from the output voltage in case of a generator that has 14 magnetic poles. Accordingly, a pulse signal having pulses of the least common multiple of the above numbers of poles, 42, can be obtained each mechanical cycle. As a result, it is not necessary to change the inside of the frequency-pulse conversion circuit 8.

If a multiple number of the pulse multiplying section is n, a delay time T2 of the output signal of the flip flop circuits 820 is preferably is not longer than 1/n of a half cycle of the pulse signal PO or the phase voltage (P-voltage), as shown in FIG. 3, so that detection delay can be minimized even if the rotation speed changes abruptly.

Figure 4:
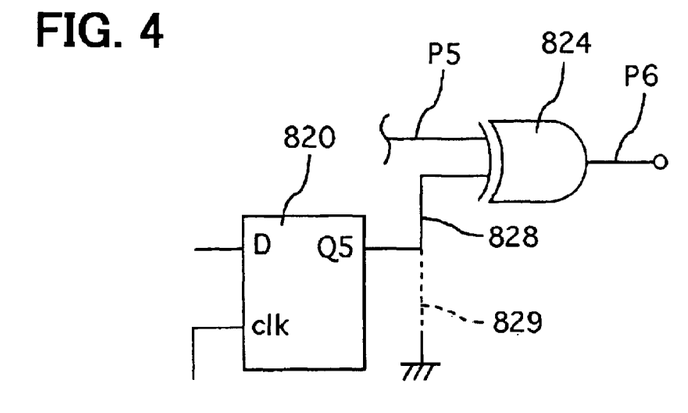
FIG. 4 is a circuit diagram of a variation of the frequency-pulse conversion circuit.

As shown in FIG. 4, an input terminal of the EX-OR circuit 824 of the final stage may be connected either to the output terminal of the D flip flop circuit 820 of the final stage, as indicated by a solid line, or to a ground as indicated by a dotted line. This selection is made by changing a wiring mask. If connected by the dotted line, the power line of the D flip flop circuit 820 of the final stage can be omitted.

Figure 5:
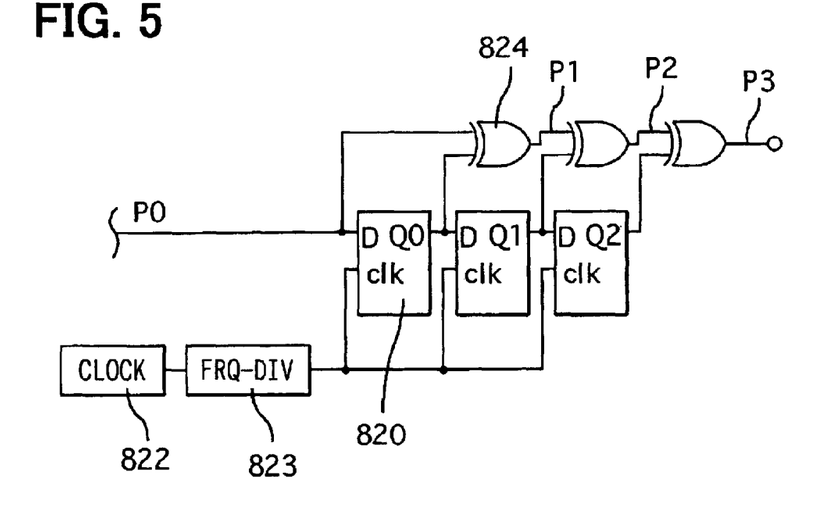
FIG. 5 is a circuit diagram of a variation of the frequency-pulse conversion circuit.

If the pulse multiplying section 82 is to be used for either an ac generator having twelve magnetic poles or an ac generator having sixteen magnetic poles, the pulse multiplying section 82 can be composed of three D flip flop circuits 820 and three EX-OR circuits 824, as shown in FIG. 5, because the least common multiple of 6 (pairs of poles, that is 12 poles) and 8 (pairs of poles, that is 16 poles) is 24. If this is applied to the ac generator having twelve magnetic poles, all three stages of the D flip flop circuits 820 and EX-OR circuits 824 are used. On the other hand, two stages of the D flip flop circuits 820 and the corresponding EX-OR circuits 824 are used if applied to the ac generator having sixteen magnetic poles. In this case, the D flip flop 820 and the EX-OR circuit 824 of the final stage are to be invalidated.

Figure 6:
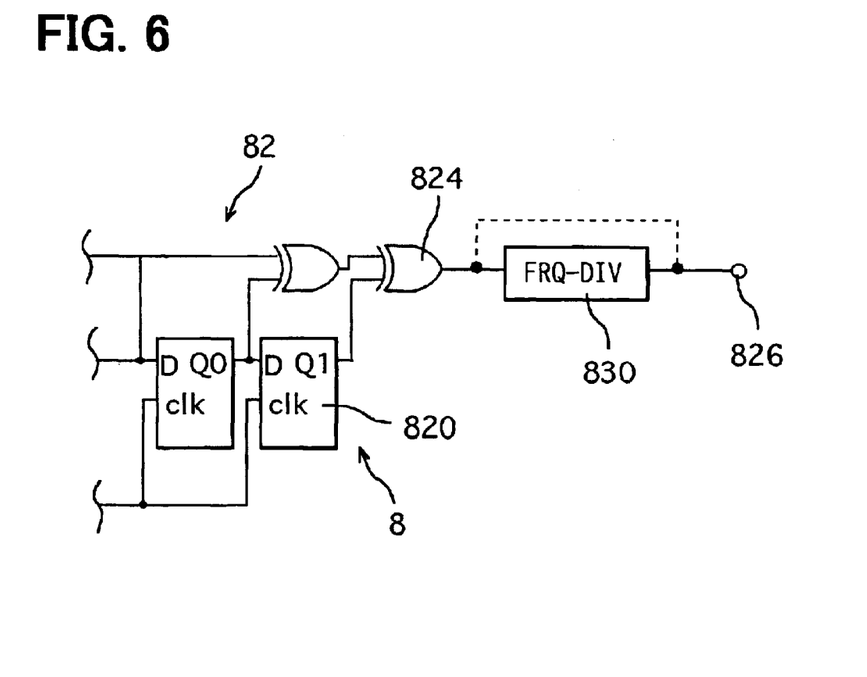
FIG. 6 is a circuit diagram of a variation of the frequency-pulse conversion circuit.

The multiple number of the frequency-pulse conversion circuit 8 can be changed by inserting a frequency dividing circuit 830 between the pulse multiplying section 82 and the output terminal 826 of the frequency conversion circuit 8, as shown in FIG. 6. The multiple number can be changed by changing the path between the pulse multiplying section 82 and the output terminal 826 from one (solid line) to the other (dotted line).

The multiple number of the frequency-pulse conversion circuit 8 can be also changed by adding one or more pulse multiplying sections 82. The additional multiplying sections are selectively connected or disconnected to provide a desired multiple number.

The multiple number of the frequency-pulse conversion circuit 8 can be also changed by providing a latch circuit or a digital circuit. The pulse multiplying section 82 may be provided by a computer and a soft ware.

An ac generator according to the second embodiment of the invention will be described with reference to FIGS. 7–9.

Figure 7:
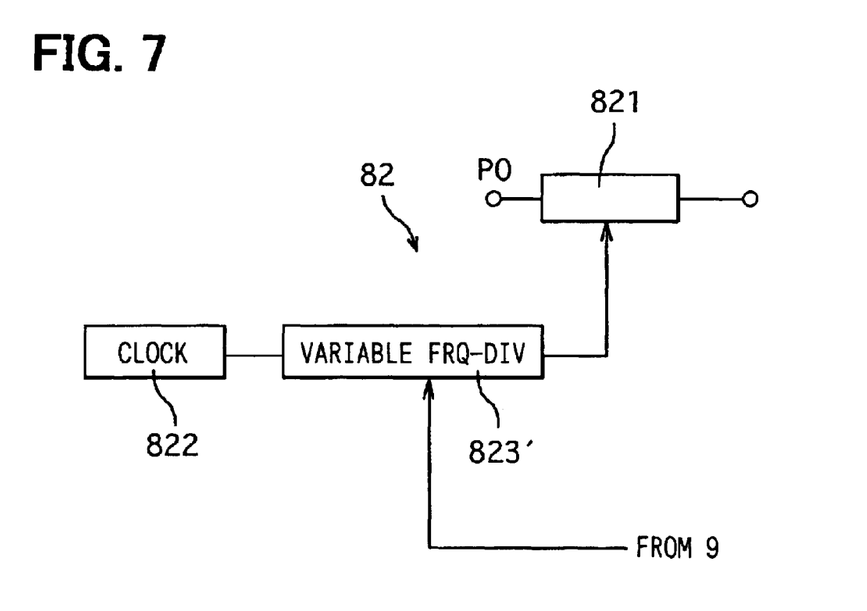
FIG. 7 is a circuit diagram of a main portion of an ac generator according to the second embodiment of the invention.

As shown in FIG. 7, a pulse multiplying section 82 includes a variable frequency dividing circuit 823' instead of the frequency dividing circuit 823 shown in FIG. 2. The pulse cycle is controlled by a command signal Sn of the voltage regulation circuit 9. The variable frequency dividing circuit 823' is composed of a counter or a register that outputs a pulse voltage each time it counts the number of pulses of the basic clock pulse reaches a number X. The number X is set according to a control signal (multiplying command signal) provided by the voltage regulation circuit 9, which is described below.

Figure 8:
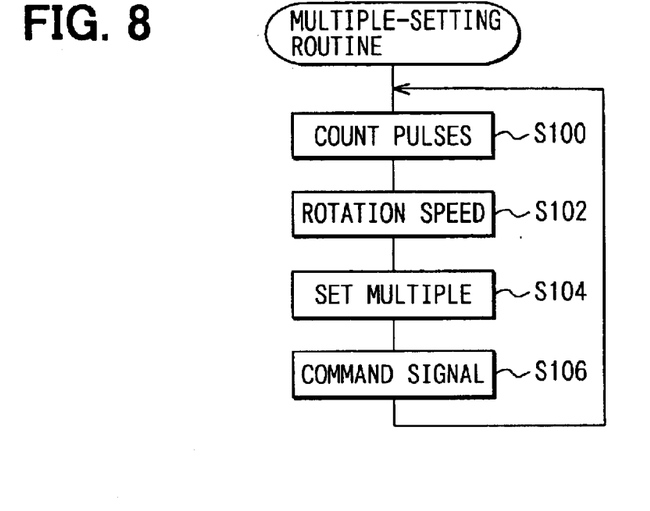
FIG. 8 is a flow diagram showing operation of a voltage regulating circuit shown in FIG. 6.

As shown in FIG. 8, the number of pulses inputted to the voltage regulation circuit 9 is counted at S100 to calculate rotation speed at S102. Then, a suitable multiple number X (X=6–10) is set at S104. A 3-bit command signal that corresponds to the suitable multiple number X is provided and applied to the variable frequency dividing circuit 823' at S106. The multiple number X corresponds to a cycle that is X times as many as the cycle of the basic clock pulse (or a cycle of a pulse that is divided at a suitable number of stages).

Figure 9:
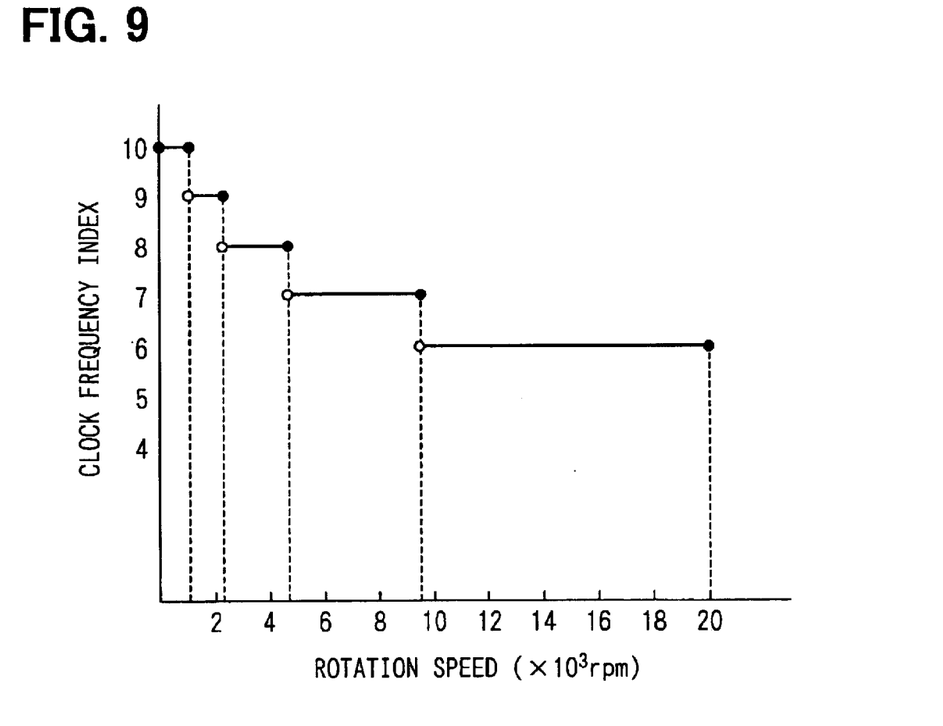
FIG. 9 is a graph showing relationship between rotation speeds and clock frequency.

As shown in FIG. 9, the cycle of the pulse signal to be inputted to the voltage regulation circuit 9 can be controlled not to be too short in a low rotation speed range, or too long in a high rotation speed range. Accordingly, the rotation speed can be detected accurately even if the rotation speed abruptly changes.

The frequency of the basic clock signal is preferably 100 or more times as many as the maximum frequency of the output voltage of the ac generator. For example, an ac generator that has 16 magnetic poles generates output voltage whose frequency is 2.67 kHz at 20,000 rpm. Therefore, the frequency of the basic clock pulse should be 267 kHz or more, preferably, 1 MHz. The delay time T2 of the D flip flop circuit 820 should not be longer than ½n the cycle of the phase-voltage of the ac generator.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An ac generator for a vehicle comprising a rotor having a plurality of magnetic poles, a stator having three phase-windings, a rectifier unit connected to said stator winding and a controller having means for detecting rotation speed of said rotor according to frequency of voltage induced in one of said phase windings, wherein:

said controller comprises a frequency-pulse conversion circuit for providing a pulse signal having a plurality of times as many frequencies as said voltage induced in one of said phase-windings; and said means detects the rotation speed based on said pulse signal.

2. The ac generator as claimed in claim 1, wherein:

said pulse signal has seven times as many frequencies as said voltage induced in one of said phase-windings;

said frequency-pulse conversion circuit comprises a wave-shaping section for converting said voltage induced in one of said phase-windings into a rectangular wave voltage signal having a frequency and a pulse multiplying section for providing a pulse signal having a predetermined number of times as many pulses as said frequency; and said pulse multiplying section comprises six serial pulse increase stages each of which adds one pulse formed from a leading edge of a pulse of a pulse signal inputted thereto that delays by a predetermined time, which is an ordinal number of the stage multiplied by the delay time.

3. The ac generator as claimed in claim 1, wherein:

said pulse signal has four times as many frequencies as said voltage induced in one of said phase-windings;

said frequency-pulse conversion circuit comprises a wave-shaping section for converting said voltage induced in one of said phase-windings into a rectangular wave voltage signal having a frequency and a pulse multiplying section for providing a pulse signal having a predetermined number of times as many pulses as said frequency; and said pulse multiplying section comprises three serial pulse increase stages each of which increases one pulse formed from a leading edge of a pulse of a pulse signal inputted thereto that delays by a predetermined delay time, which is an ordinal number of the stage multiplied by the delay time.

4. The ac generator as claimed in claim 3, wherein:

said frequency-pulse conversion circuit comprises a clock for generating a basic clock signal and plurality of serially-connected frequency dividing circuits; and said basic clock signal has such a frequency that accumulated duration of edges of the output signal of the final one of said pulse increase stages can be shorter than a half of a maximum cycle of said voltage induced in one of said phase windings.

5. The ac generator as claimed in claim 1, wherein:

said frequency-pulse conversion circuit provides said pulse signal having a pulse cycle that is determined according to a multiplying command signal sent from said means;

said means determines said pulse cycle according to the rotation speed of the rotor that is calculated from a frequency of said pulse signal inputted thereto so that said pulse cycle can become shorter as the rotation speed of said rotor is higher and longer as the rotation speed is lower.

6. The ac generator as claimed in claim 1, wherein said frequency-pulse conversion circuit includes a pulse multiplying section and a wiring mask disposed on an IC chip;

pulse multiplying section comprising a shift register and a plurality of serially connected exclusive OR circuits, at least two selectable lead wires respectively connected to the exclusive OR circuits of a prescribed stage and an output terminal connected to selected one of said lead wires, thereby providing one of a pulse signal having a first number of times as many frequencies as the frequency of voltage induced in one of said phase-windings and a second number of times as many frequencies as the frequency of voltage induced in one of said phase-windings.

7. The ac generator as claimed in claim 6, wherein said means is integrated into said IC chip together with said frequency-pulse conversion circuit.

8. The ac generator as claimed in claim 6, wherein said frequency-pulse conversion circuit includes a wave-shaping section for forming said voltage induced in one of said phase-windings into a rectangular wave voltage signal having a frequency.

* * * * *